(12) United States Patent
Suzuki

(10) Patent No.: US 8,551,649 B2
(45) Date of Patent: Oct. 8, 2013

(54) SEALED BATTERY

(75) Inventor: Satoshi Suzuki, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 12/680,994

(22) PCT Filed: Dec. 16, 2008

(86) PCT No.: PCT/JP2008/072817
§ 371 (c)(1),
(2), (4) Date: Mar. 31, 2010

(87) PCT Pub. No.: WO2010/070726
PCT Pub. Date: Jun. 24, 2010

(65) Prior Publication Data
US 2011/0274967 A1 Nov. 10, 2011

(51) Int. Cl.
H01M 2/08 (2006.01)
H01M 2/04 (2006.01)
H01M 2/00 (2006.01)

(52) U.S. Cl.
USPC ........... 429/185; 429/180; 429/176; 429/175; 429/163

(58) Field of Classification Search
None
See application file for complete search history.

(56) References Cited

U.S. PATENT DOCUMENTS

| 4,263,380 A * | 4/1981 | Riedl ............................. 429/162 |
| 6,627,348 B1 | 9/2003 | Haraguchi et al. |
| 6,746,798 B1 | 6/2004 | Hiratsuka et al. |
| 2010/0104941 A1 * | 4/2010 | Nakabayashi ................ 429/181 |

FOREIGN PATENT DOCUMENTS

| EP | 1 886 740 A1 | 2/2008 |
| JP | 11-67161 | 3/1999 |
| JP | 11-162419 | 6/1999 |
| JP | 2000-133211 | 5/2000 |
| JP | 2002-279944 | 9/2002 |
| JP | 2005-71710 | 3/2005 |
| JP | 2006-324055 | 11/2006 |
| JP | 2008-251474 | 10/2008 |
| JP | 2008-311193 A | 12/2008 |
| WO | WO 99/25036 A1 | 5/1999 |
| WO | WO 2008/044548 * | 4/2008 |
| WO | WO 2008/155616 A1 | 12/2008 |

* cited by examiner

Primary Examiner — Patrick Ryan
Assistant Examiner — Yoshitoshi Takeuchi
(74) Attorney, Agent, or Firm — Finnegan, Henderson, Farabow, Garrett & Dunner, LLP

(57) ABSTRACT

A sealed battery provided by this invention has a case (10) having an opening portion, and a lid (60) which closes the case opening portion. An inside protruding portion which enters into the case and mates with the case opening portion is formed in the face of the lid opposing the case, and a case peripheral wall portion (14) surrounding the opening portion and the lid are joined by welding. And, in a region in which the case peripheral wall portion and the lid are in close proximity, and which is at least a region including the inside edge (16) of the peripheral wall portion forming the case opening portion periphery, a barrier layer (70) is provided which impedes direct contact between the peripheral wall portion and the lid, and moreover, the edge portion of the barrier layer on the outer side of the case is formed midway in the opening end face (15) of the case peripheral wall portion, between the outside edge and the inside edge, without reaching the outside edge (18) of the peripheral wall portion.

11 Claims, 3 Drawing Sheets

SEALED BATTERY

This application is a national phase application of International Application No. PCT/JP2008/072817, filed Dec. 17, 2008, the contents of which are incorporated herein by reference.

TECHNICAL FIELD

This invention relates to a sealed battery and to a battery case and lid for use in constructing a battery. More specifically, this invention relates to a seal structure for the case and lid.

BACKGROUND ART

In recent years, lithium ion batteries, nickel hydride batteries, and other secondary batteries have become increasingly important as power sources for mounting in vehicles using electricity as a driving source, and as power sources installed in personal computers, portable terminals, and other electronic products and similar. In particular, lithium ion batteries, which are lightweight and can achieve high energy densities, are regarded favorably as high-output power sources for mounting in vehicles.

One mode of such batteries is a sealed battery in which a prescribed electrode unit and electrolyte are accommodated within a case. Typically in construction of such a sealed battery, after an electrode unit comprising the positive electrode and the negative electrode is accommodated by a metal case, a lid is installed in the opening portion of the case (that is, the accommodating opening which accommodates the electrode unit), to perform sealing.

As sealing means used in this type of battery, various methods are available. Typically, laser welding employing a YAG laser, $CO_2$ laser, or other heat source is often used. In particular, laser welding enables the selective and local application of heat, and so is preferred. However, there are concerns that on rare occasions sputtered material may fly into gaps within the case and result in internal short-circuits or similar.

Also, the surface of the lid opposing the case (the surface at which the inside of the case is positioned when installed in the case opening portion) has a portion which enters into the case opening portion (hereafter called the "inside protruding portion") in order to prevent welding defects and to prevent shifts in position of the lid, but this inside protruding portion of the lid may be formed in a shape which makes close contact with the peripheral wall portion of the case when the lid is installed in the case opening portion, that is, a shape such that there exists no gap (clearance) between the inside protruding portion of the lid and the periphery of the case opening portion. However, in such a state with no clearance, if the relative positions of the lid and the case opening portion when installing the lid in the case opening portion are not correct, and a shift in positions occurs, then there are concerns that the inside edge (that is, the opening portion periphery) of the opening end portion of the case peripheral wall portion and the inside protruding portion of the lid may grind together powerfully, and that "galling" may occur. The occurrence of "galling" may cause the inclusion of metal particles (that is, shaved particles) arising from this shaving within the case, resulting in internal short-circuits and similar, and so is undesirable.

Examples of related technologies of this type are described in Patent Documents 1 through 4. In the technology described in Patent Document 1, by coating the entirety of the outside walls of the outer receptacle (case) of the battery with a protective film, the occurrence of shaving which is possible during lid installation is suppressed. And in the technologies of Patent Documents 2 through 4, disclosures are made relating to the shapes of the mating portions of the case and lid so as to enable suppression of internal short-circuits due to flying sputtered material.

However, according to Patent Document 1, shaved particles which tend to occur at the time of installation of the lid on the case opening portion are suppressed, but because at the time of welding the surface irradiated with laser light is also covered with the protective film, the metals comprised by the case and lid are insufficiently melted, and there are concerns that welding defects may occur. And, in Patent Documents 2 through 4, flying sputtered material can be suppressed, but in all these cases it is difficult to suppress the occurrence of shaved particles.

Patent Document 1: Japanese Patent Application Laid-open No. 2005-71710
Patent Document 2: WO99/25036
Patent Document 3: Japanese Patent Application Laid-open No. 2002-279944
Patent Document 4: Japanese Patent Application Laid-open No. 11-162419

DISCLOSURE OF THE INVENTION

This invention was created in order to resolve the above problems of the prior art, and has as an object the provision of a sealed battery with high reliability in suppressing the occurrence of shaving during lid installation and flying of welding sputtered material to the case interior. A further object is to provide a combination case and lid for a sealed battery to attain this object, as well as a method of manufacturing a sealed battery.

A sealed battery provided by this invention to solve the above problems comprises a case having an opening portion and a lid which closes the case opening portion, an inside protruding portion which enters into the case and mates with the case opening portion is formed in a face of the lid opposing the case; and a peripheral wall portion of the case surrounding the case opening portion and the lid are joined by welding. And, in a region in which the case peripheral wall portion and the lid are in close proximity, and which is at least a region including an inside edge of the peripheral wall portion forming a case opening portion periphery, a barrier layer is provided which impedes direct contact between the peripheral wall portion and the lid, and moreover, an edge portion of the barrier layer on the outer side of the case is formed midway in the opening end face of the case peripheral wall portion, between the outside edge and the inside edge, without reaching the outside edge of the peripheral wall portion.

In this Specification, "battery" means a storage device from which prescribed electrical energy can be extracted, and is not limited to a specific storage mechanism (configuration of electrode members and electrolyte). A lithium ion battery, nickel hydride battery, and other secondary batteries, as well as electrical dual-layer capacitors and other capacitors (that is, physical cells), are representative examples included in what are here called "batteries".

Further, in this Specification, "case" means a member comprised by a battery disclosed herein, which is a battery housing accommodating the electrode unit and electrolyte, and having an opening member (that is, an opening to accommodate the electrode unit).

Also, in this Specification "galling" means the occurrence of irregular microscopic or macroscopic masses at the contact face between case and lid (friction surfaces which grind together), and "shaved particles" means metal particles which are masses occurring in this shaving which have dissociated from the case or from the lid.

A battery of this invention is a sealed battery in which a lid (typically made of metal) is installed in the opening portion of the case (typically made of metal), and in which the case peripheral wall portion surrounding the opening portion and the lid are joined (sealed) by welding. In a battery of the invention having the above configuration, a barrier layer is comprised in a region comprising the inside edge in the opening end face of the case peripheral wall portion forming the case opening portion periphery, which is a place at which shaving readily occurs at the time of lid installation. Consequently, the occurrence of shaving which may occur during lid installation is suppressed, and moreover sputtered material due to welding is impeded by the barrier layer, so that there are no concerns that such material may fly into the case. Further, of the above edge portion (rim) of the barrier layer, the barrier layer edge portion positioned on the outer side of the case is only formed until midway between the outside edge and the inside edge in the opening end face of the case peripheral wall portion, and does not extend over the entire opening end face of the case peripheral wall portion (that is, does not reach the outside edge). That is, the barrier layer is not formed on the lid and the case peripheral wall portion of the portion forming the laser-irradiated face accompanying welding (specifically, the region in proximity to the case peripheral wall portion and lid, which is at least the welding region on the outer side of the case including the outside edge of the case peripheral wall portion), so that the metal forming the lid and case of the irradiated face can be reliably welded without being impeded by the barrier layer. As a result, a sealed battery with high reliability, having satisfactory sealing characteristics (performance in preventing electrolyte leakage and moisture intrusion into the case) is provided.

In a preferred mode of a battery provided by this invention, the distance L between the edge portion (rim) of the barrier layer on the outer side of the case and the edge on the inside of the peripheral wall portion is determined so as to satisfy L≤0.5t, where t is the thickness of the opening end face of the peripheral wall portion, defined by the distance between the outside edge and the inside edge.

In a battery in which the distance L to the barrier layer and the thickness t of the opening end face of the case peripheral wall portion are such that L≤0.5t, that is, the barrier layer does not extend in the direction of the outside edge of the case peripheral wall portion exceeding one-half of the thickness of the opening end face of the peripheral wall portion from the inside edge of the case peripheral wall portion, a directly opposing welding region of the case peripheral wall portion and the lid can be adequately secured without interference by the barrier layer. Consequently a highly reliable sealed battery with satisfactory sealing characteristics can be provided.

Further, in another preferred mode of a battery provided by this invention, the average thickness M of the portion of the barrier layer formed between the edge portion (rim) on the outer side of the case and the inside edge of the peripheral wall portion is determined so as to satisfy M≤0.3t, where t is the thickness of the opening end face of the peripheral wall portion, defined by the distance between the outside edge and the inside edge.

By setting the average thickness M of the portion of the barrier layer formed on the opening end face of the case peripheral wall portion to a value satisfying M≤0.3t, the occurrence of shaving during installation of the lid in the case opening portion can be prevented, and moreover the spacing between the lid and the case peripheral wall portion can be held within a prescribed range (typically, substantially the same as the average thickness M, that is, 0.3t or less). Hence despite the interposing of the barrier layer, the case peripheral wall portion and the lid can be brought into sufficiently close proximity for welding. Consequently according to this mode, a highly reliable sealed battery with high welding strength and with sealing characteristics assured can be provided.

In a preferred mode of a battery provided by the invention, t is in a range between 0.3 mm and 2 mm. Even when the distance between the outside edge and the inside edge of the opening end face of the case peripheral wall portion, that is, the thickness t of the opening end face of the case peripheral wall portion, is set within this range of numerical values, through application of this invention, the occurrence of shaving can be prevented, and moreover flying into the case of sputtered material occurring during welding can be prevented in advance. Hence by means of this invention, a lightweight and highly reliable sealed battery comprising a comparatively thin case can be provided.

Further, in another preferred mode of a battery provided by the invention, the barrier layer is made of a synthetic resin or a rubber.

When the barrier layer is formed from synthetic resin or rubber, shaving does not readily occur even when the lid and the case peripheral wall portion are in contact, and the occurrence of shaved particles (that is, metal particles) originating in the lid or the case peripheral wall portion can be prevented. In particular, a barrier layer formed from a synthetic resin or rubber with high resistance to corrosion by electrolytes can prevent electrolyte leakage and moisture intrusion into the case.

Further, this invention provides a case and a lid for a sealed battery which achieves the above objects. Further, a combination of these is provided. That is, a lid and battery case forming a combination provided by the invention are a lid and a battery case forming a sealed battery disclosed herein, and are characterized in that, on the rear face side of the lid is formed an inside protruding portion to enter into the case and mate with the case opening portion, and when the lid is mated with the case opening portion, in the region in which the case peripheral wall portion and the lid are in close proximity, which is at least the region comprising the inside edge of the peripheral wall portion forming the case opening portion periphery, a barrier layer, which impedes direct contact of the peripheral wall portion and the lid, is provided on at least one among the peripheral wall portion and the lid. Further, the barrier layer is provided so as to be formed midway on the opening end face of the case peripheral wall portion between the outside edge and the inside edge, without the edge portion of the barrier layer on the outer side of the case reaching the outside edge of the peripheral wall portion when in the state in which the lid is mated with the case opening portion.

The case and lid for a sealed battery disclosed herein have provided a barrier layer, on one of the case peripheral wall portion which is equivalent to the case opening portion periphery and the lid, which are places of contact at which shaving readily occurs at the time of lid installation; hence the occurrence of shaving at the time of installation of the lid in the case opening portion is suppressed, and moreover the barrier layer can impede sputtered material occurring at the time of welding of the lid and case from flying into the case. Further, in the state in which the lid is installed in the case, the barrier layer is formed only midway on the opening end face of the case peripheral wall portion between the outside edge and the inside edge, so that joining of the case and lid by welding is not impeded by the barrier layer, and reliable fusion can be obtained. Hence by using a lid and battery case of this invention, a highly reliable sealed battery having a satisfactory sealed structure is provided.

Further, in a case and lid for a sealed battery of a preferred mode provided by this invention, the distance L between the edge portion of the barrier layer on the outer side of the case and the inside edge of the peripheral wall portion is determined so as to satisfy L≤0.5t, where t is the thickness of the opening end face of the peripheral wall portion, defined by the distance between the outside edge and the inside edge.

By using such a lid and case, a directly opposing welding region of the case peripheral wall portion and the lid can be adequately secured without interference by the barrier layer. Consequently a highly reliable sealed battery with satisfactory sealing characteristics can be constructed.

Further, in a case and lid for a sealed battery of another preferred mode provided by this invention, the average thickness M of the portion of the barrier layer formed between the edge portion on the outer side of the case and the inside edge of the peripheral wall portion is determined so as to satisfy M≤0.3t, where t is the thickness of the opening end face of the peripheral wall portion, defined by the distance between the outside edge and the inside edge.

By using such a lid and case, the occurrence of shaving during installation of the lid in the case opening portion can be prevented, and moreover the spacing between the lid and the case peripheral wall portion can be held within a prescribed range (typically, substantially the same as the average thickness M, that is, 0.3t or less). Hence despite the interposing of the barrier layer, the case peripheral wall portion and the lid can be brought into sufficiently close proximity for welding. Consequently a highly reliable sealed battery with high welding strength and with sealing characteristics assured can be constructed.

Further, in a case and lid for a sealed battery of another preferred mode provided by this invention, the barrier layer is of synthetic resin or of rubber.

When the barrier layer is formed from synthetic resin or rubber, at the time of battery construction, shaving does not readily occur even when the barrier layer is in contact with the lid or the case peripheral wall, and the occurrence of shaved particles (that is, metal particles) originating in the lid or the case peripheral wall portion can be prevented.

As another aspect of this invention, by preparing a case and lid for any of the sealed batteries disclosed herein, a method of manufacturing a sealed battery is provided.

A method of manufacturing a sealed battery of this invention is a method of manufacturing a sealed battery having a case having an opening portion and a lid which closes the case opening portion, and comprises the following steps. That is, the method comprises: a step of preparing a case and a lid, having characteristics that an inside protruding portion that enters into the case and mates with the case opening portion is formed in a face of the lid opposing the case, that when the inside protruding portion of the lid is mated with the case opening portion, in a region in which the case peripheral wall portion surrounding the case opening portion and the lid are in close proximity, and which is at least a region including an inside edge of the peripheral wall portion forming the case opening portion periphery, a barrier layer which impedes direct contact between the peripheral wall portion and the lid is provided in at least one of the peripheral wall portion and the lid, and moreover, the edge portion of the barrier layer on the outer side of the case is formed midway in the opening end face of the case peripheral wall portion, between the outside edge and the inside edge, without reaching the outside edge of the peripheral wall portion; a step of accommodating at least one electrode unit within the prepared case; a step of closing the case opening portion with the lid; and, a step of welding the lid, which closes the case opening portion, to the case peripheral wall portion surrounding the case opening portion, thereby welding primarily a region in which the case peripheral wall portion and the lid are in close proximity, and which is a region in which the barrier layer is not formed.

Moreover, examples of combinations of a preferred case and lid in this manufacturing method are as described above.

Further, this invention provides a vehicle comprising any of the sealed batteries disclosed herein (sealed batteries which can be manufactured by a method disclosed herein). A sealed battery provided by this invention can exhibit quality (for example, excellent sealing characteristics, prevention of internal short-circuits, and similar) appropriate for a sealed battery mounted in a vehicle. Hence such batteries can be suitably used as power sources for motors (electric motors) mounted in vehicles, such as automobiles, comprising electric motors, such as hybrid automobiles, electric automobiles, and fuel cell automobiles.

BEST MODE FOR CARRYING OUT THE INVENTION

Figure 1:
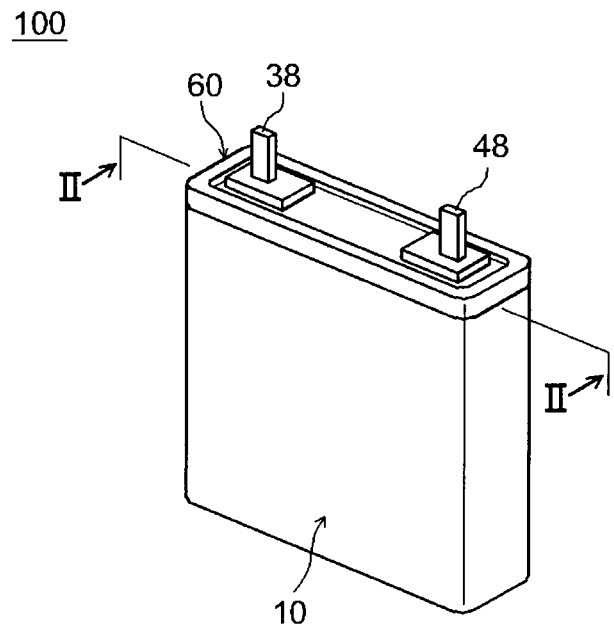
FIG. 1 is a perspective view schematically showing the sealed battery of one embodiment of the invention.

Below, preferred embodiments of the invention are explained. In this Specification, matters other than those stated explicitly which are necessary to implement the invention can be grasped as design matters by a practitioner of the art based on conventional technology in this field. This invention can be implemented based on the disclosures of this Specification and based on well-known engineering knowledge in this field.

A sealed battery of this invention is a battery in which a lid which closes a case opening portion is sealed by welding to the case peripheral wall portion, and is characterized in that a barrier layer is provided in a region including the inside edge of the peripheral wall portion equivalent to the case opening portion periphery.

Below, details of the invention are explained, taking as an example a sealed battery constructed using a lid and a case with the barrier layer provided on the case side. However, the invention is not limited to this embodiment.

In the following drawings, the same symbols are assigned to members and portions which exhibit the same action, and redundant explanations may be omitted or simplified. Moreover, dimensional relations in the drawings (lengths, widths, thicknesses, and similar) do not reflect actual dimensional relationships.

Figure 2:
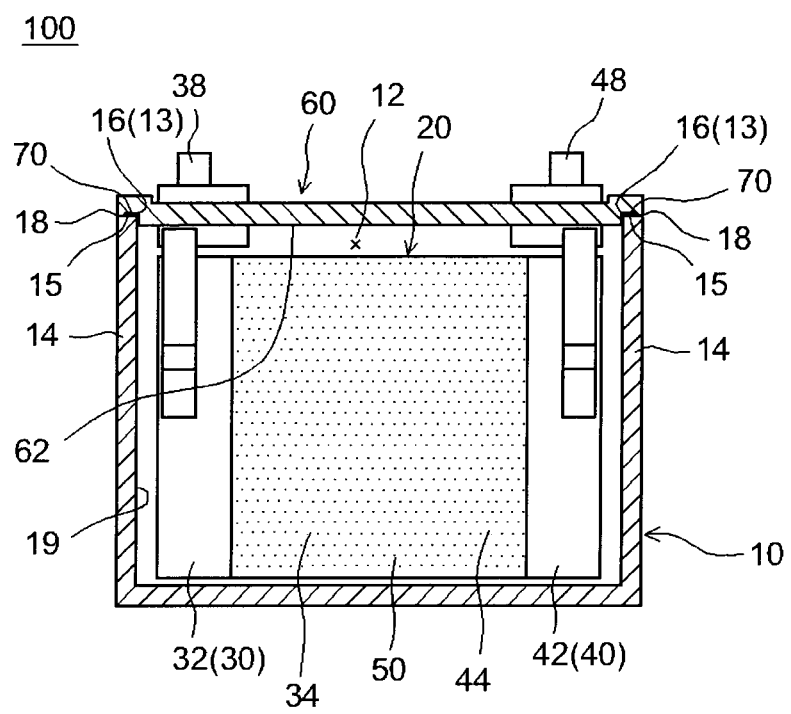
FIG. 2 is a cross-sectional view along line II-II in FIG. 1.

FIG. 1 is a perspective view schematically showing the sealed battery 100 of one embodiment of the invention. FIG. 2 is a cross-sectional view along line II-II in FIG. 1.

As shown in FIG. 1 and FIG. 2, the sealed battery 100 of this embodiment comprises a rectangular parallelepiped square case 10, and a lid 60 which closes the opening portion 12 of the case 10. The case 10 is a rectangular parallelepiped housing comprising a peripheral wall portion 14 forming the side faces of the case 10 and, as seen from the opening portion 12, a bottom portion, not shown; a rectangular opening portion 12 is formed in the portion surrounded by the opening end face 15 of the peripheral wall portion 14 (that is, the end face forming the periphery of the opening portion 12). An electrode unit 20 and electrolyte can be accommodated within the case 10 by means of this opening portion 12. The opening end face 15 of the peripheral wall portion 14 has an inside edge 16, equivalent to the opening portion periphery 13, and a thickness t (see FIG. 3), defined by the distance to the outside edge 18 positioned on the outer side of the case.

As shown in FIG. 2, the lid 60 is installed so as to close the opening portion 12 of the case 10. the lid 60 has the same size and shape as the bottom face of the case 10, and is formed in a rectangular plate shape so as to be positioned on the opening portion 12 and form one face of the case 10; in the center portion of the face of the lid 60 opposing the case 10 (the face positioned on the inside of the case 10 when installed in the case opening portion 12; similarly below) is formed an inside protruding portion 62 which enters into the opening portion 12 upon installation of the lid 60 in the case opening portion 12. That is, in the sealed battery 100 of this embodiment, the inside protruding portion 62 of the lid 60 enters into and mates with the case 10.

Further, as shown in FIG. 1 and FIG. 2, a positive-electrode terminal 38 and negative-electrode terminal 48 for external connection are provided on the lid 60, and portions of these terminals 38, 48 protrude on the surface side of the lid 60. The positive-electrode terminal 38 and negative-electrode terminal 48 are electrically connected to an end portion of a positive-terminal current collector 32 (specifically, a positive-electrode sheet 30 which is the positive-terminal current collector 32 on which is formed a positive-electrode active-material layer 34) and to an end portion of a negative-terminal current collector 42 (specifically, a negative-electrode sheet 40 which is the negative-terminal current collector 42 on which is formed a negative-electrode active-material layer 44), respectively, of an electrode unit 20 (see FIG. 2) which is accommodated within the case 10.

As the shapeable material for forming the case 10 and the lid 60, a metal material is preferred. As explained below, a sealed battery 100 of this embodiment is formed by welding a lid 60 installed in the case opening portion 12 to perform sealing, so that any shapeable material which can be welded can be used without imposing limits in particular on the material type; however, a metal material which is lightweight and has good thermal conductivity can preferably be used. Such metal materials include, for example, aluminum, aluminum alloys, stainless steel, nickel plated steel, and similar. Aluminum and aluminum alloys, which are lightweight and have good thermal conductivity, are especially preferable.

The shapeable materials forming the case 10 and the lid 60 may be the same material, or different materials may be used. However, because a case 10 and lid 60 formed from the same material have the same thermal conductivity, melting point temperature, and other physical properties, no unevenness in metal fusion occurs due to the heat of welding, so that use of the same material is preferable. In this embodiment, the case 10 and lid 60 are both formed from aluminum.

A case 10 and lid 60 with the above shapes can be shaped to the desired shape by press molding from sheet material of the appropriate metal material, or by other means.

Figure 3:
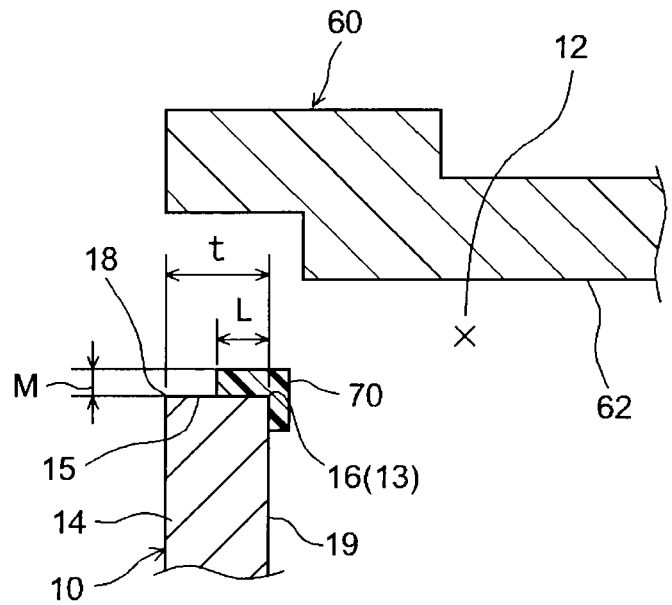
FIG. 3 is an enlarged schematic view of the opposing regions of the case peripheral wall portion and lid prior to lid installation.
Figure 4:
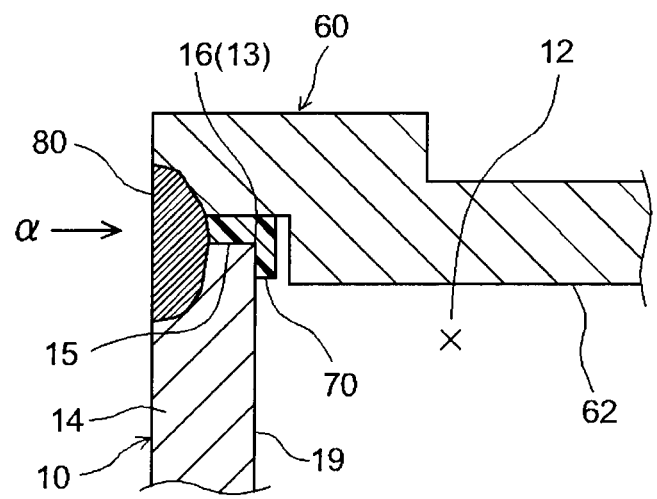
FIG. 4 is an enlarged schematic view of the opposing regions of the welded case peripheral wall portion and lid after lid installation.

Next, the structure of the sealed portion of the case 10 and lid 60 comprising the barrier layer 70 is explained in detail, using FIG. 3 and FIG. 4.

FIG. 3 is an enlarged schematic view of the proximal (opposing) regions of the case peripheral wall portion 14 and lid 60 in FIG. 2 (prior to lid installation). FIG. 4 is an enlarged schematic view of the proximal (opposing) regions of the case peripheral wall portion and lid after lid installation and welding.

As shown in FIG. 3, the case 10 of the sealed battery 100 of this embodiment is provided with a barrier layer 70 in a region in which the case peripheral wall portion 14 and lid 60 are proximal (opposing), which is a region including the inside edge 16 of the peripheral wall portion 14 equivalent to the case opening portion periphery 13. It is preferable that, as shown, the barrier layer 70 includes the inside edge 16 at the center, that one edge portion (the rim on the outer side of the case) is formed midway on the opening end face 15 of the case peripheral wall portion 14 between the outside edge 18 and the inside edge 16, and moreover that the other edge portion (the rim on the inner side of the case) passes the inside edge 16 and is formed extending to the inside wall face 19 of the case peripheral wall portion 14. In other words, the barrier layer 70 is formed at a position which impedes direct contact between the peripheral wall portion 14 and the lid 60. Hence the occurrence of shaving which can occur at the time of installation of the lid 60 can be suppressed, and even if sputtered material were to occur due to welding, because of obstruction by the barrier layer 70, there are no concerns that sputtered material might fly into the case 10.

The edge portion of the barrier layer 70 on the outer side of the case 10 (the rim of the barrier layer 70 closer to the laser-irradiated face due to welding) is formed midway on the opening end face 15 of the case peripheral wall portion 14 between the outside edge 18 and the inside edge 16, without reaching the outside edge 18 of the peripheral wall portion. That is, the barrier layer 70 is not formed (does not protrude) on the portions of the case peripheral wall portion 14 and lid 60 forming the laser-irradiated face during welding.

Here, as shown in FIG. 4, the laser-irradiated face is the welding region 80 in which the peripheries of the case peripheral wall portion 14 and lid 60 are directly opposed from the position indicated by the arrow α, and is at least the portion in which the barrier layer 70 is not formed on the outside of the case comprising the outside edge 18 of the case peripheral wall portion 14; this region 80 is irradiated with laser light, causing local fusion and solidification, so that the case peripheral wall portion 14 and the lid 60 can be joined. Hence the battery 100 of this embodiment comprises a sealed structure resulting from welding of the case 10 and lid 60 by laser irradiation of the region 80 from the side α of the case 10. In this region 80 the barrier layer is not formed, so that the heat of laser irradiation is not absorbed by the barrier layer 70, and heat is transmitted uniformly over the entire irradiated face, so that welding and joining of the case peripheral wall portion 14 and the lid 60 is performed satisfactorily. By this means, a sealed battery 100 having satisfactory sealing characteristics (sealed structure) which prevents electrolyte leakage and moisture intrusion into the case can be obtained. In this embodiment, various laser welding methods can be utilized without imposing limitations; for example, YAG lasers, Nd:YAG lasers, $CO_2$ lasers, and similar are examples of appropriate heat sources.

Further, it is preferable that the barrier layer 70 be provided so as to satisfy the following relation with the thickness t of the opening end face 15 of the case peripheral wall portion 14, defined by the distance between the inside edge 16 and the outside edge 18 of the case peripheral wall portion.

First, the distance L (see FIG. 3) between the edge portion of the barrier layer 70 on the outer side of the case and the inside edge 16 of the case peripheral wall portion 14 is expressed by the relation L≤0.5t. It is preferable that the distance L be set in the range 0.3t≤L≤0.5t. When a barrier layer 70 comprising a distance L expressed by this relation is provided on the case 10, in welding at the time of sealing there are no concerns that sputtered material might fly into the case 10. Also, the barrier layer 70 is not formed on portions forming the laser-irradiated face during welding, so that the case peripheral wall portion 14 and the lid 60 are strongly joined.

Further, in the barrier layer 70 the average thickness M (see FIG. 3) of the portion of the barrier layer 70 formed between the edge portion on the outer side of the case and the inside edge 16 of the case peripheral wall portion 14 is expressed by the relation M≤0.3t. When a barrier layer 70 comprising an average thickness M expressed by this relation is provided on the case 10, in addition to preventing in advance the occurrence of shaving during installation of the lid 60, the distance between the lid and the case opening end face 15 in the region of direct opposition (welding region) of the case peripheral wall portion 14 and the lid 60 is short, and adequate welding strength can be achieved.

It is preferable that the average thickness M be set in the range 0.05t≤M≤0.3t. It is still more preferable that the value be set in the range 0.05t≤M≤0.1t.

It is particularly preferable that the barrier layer be formed so as to satisfy both of the above-described 0.3t≤L≤0.5t and 0.05t≤M≤0.3t (and still more preferably 0.05t≤M≤0.1t).

No limitations in particular are placed on the thickness t of the opening end face 15 of the case peripheral wall portion 14, defined by the distance between the inside edge 16 and the outside edge 18 of the peripheral wall portion, so long as the objects of this invention can be attained. For example, t can be provided in the range 0.3 mm to 2 mm. As the range of the thickness t, from 0.5 mm to 1.5 mm is preferable, and from approximately 0.8 to 1.2 mm is particularly preferable. A battery 100 comprising a case with such a comparatively small thickness t comprises a strength sufficient to protect the electrode unit 20 and similar accommodated within the case 10 from external shocks, and a lightweight and highly reliable sealed battery can be obtained.

Further, the barrier layer 70 comprises a material of synthetic resin or rubber. Synthetic resin and rubber have mechanical strength and chemical stability, and moreover can be procured inexpensively. Also, when the barrier layer 70 is formed from synthetic resin or rubber, shaving does not readily occur even when the barrier layer 70 makes contact with the lid 60 or the case peripheral wall portion 14, and the occurrence of shave particles (that is, metal particles) originating in the lid 60 or the case peripheral wall portion 14 can be prevented.

As synthetic resin material forming a barrier layer, an olefin system resin or similar with high resistance to corrosion by electrolytes is preferable; for example, when constructing lithium ion batteries or other batteries using non-aqueous electrolytes, polyethylene (PE), polypropylene (PP), polytetrafluoroethylene (PTFE), polyphenylene sulfide (PPS) or similar, or a combination thereof, can preferably be used. As rubber materials, for example when constructing lithium ion batteries or other batteries using non-aqueous electrolytes, ethylene propylene rubber (EPM), ethylene propylene diene rubber (EPDM), styrene butadiene rubber (SBR), butadiene rubber (BR), butyl rubber (IIR), nitrile butadiene rubber (NBR), chloroprene rubber (CR), and similar can be used. Or, a thermoplastic elastomer (TPE) may be used.

No limitations in particular are imposed on the means for forming a barrier layer 70, formed from the above materials, in a region including the inside edge 16 of the case peripheral wall portion 14, so long as the objects of this invention can be attained; for example, by covering the region with adhesive seal material, which is a film of a synthetic resin or rubber with an adhesive material applied to one face, a barrier layer 70 can easily be formed. Commercially marketed synthetic resin or rubber seal materials can be used, with no limitations in particular imposed.

No limitations in particular are placed on the electrode unit 20, electrolyte, or other constituent elements of a sealed battery 100 constructed by combining a case 10 with a barrier layer 70 such as described above provided and a lid 60; in this embodiment, a lithium ion battery 100 comprising a wound-type electrode unit 20 was constructed. Below, other constituent elements thereof are explained, but no limitations are placed on embodiments of this invention.

As shown in FIG. 2, in this embodiment a flat-shape electrode unit 20 is accommodated within the case 10. The electrode unit 20 comprises a positive-electrode sheet 30 having a positive-electrode active-material layer 34 on a surface of a long sheet-shape positive-electrode current collector 32, a negative-electrode sheet 40 having a negative-electrode active-material layer 44 on a surface of a long sheet-shape negative-electrode current collector 42, and a long sheet-shape separator 50; the positive-electrode sheet 30 and negative-electrode sheet 40 are superposed together with two separators 50 and wound, and the wound member obtained is pressed from a side direction and crushed, and is flattened, to form a flat shape.

The positive-electrode terminal 38 is joined to the terminal portion of the positive-electrode current collector 32, the negative-electrode terminal 48 is joined to the terminal portion of the negative-electrode current collector 42, and these are electrically connected to the positive-electrode sheet 30 and negative-electrode sheet 40 formed into the above flattened shape. As the method of joining the positive- and negative-electrode terminals 38, 48 and current collectors 32, 42 respectively, for example an ultrasonic welding method, resistive welding method, or various other welding methods can be used.

As the positive-electrode current collector 32 comprised by the positive-electrode sheet 30, a sheet material of a metal with good conductivity can be used. For example, a conductive member of aluminum, or of an alloy the main component of which is aluminum, may be used. As the electrode active material which is the main component of the positive-electrode active-material layer 34, one type, or two or more types, of a material used in lithium ion batteries of the prior art can be used, with no limitations in particular imposed. For example, a lithium-transition metal composite oxide or similar can preferably be used. As the conductive material, acetylene black, kitchen black, or another carbon powder can be added.

On the other hand, as the negative-electrode current collector 42 comprised by the negative-electrode sheet 40, a sheet material of copper or another metal with good conductivity can be used. As the electrode active material which is the main component of the negative-electrode active-material layer 44, one type, or two or more types, of a material used in lithium ion batteries of the prior art can be used, with no limitations in particular imposed. For example, a particle-form carbon material with a graphite structure (layered structure) may be used.

The positive-electrode sheet 30 and negative-electrode sheet 40 can be preferably manufactured by imparting compositions, in which the electrode active materials are dispersed in an appropriate solvent, onto the respective current collectors 32, 42, and then drying the compositions. As the solvent, for example water or another water-based solvent, or N-methyl-2-pyrrolidone (NMP), methylethyl ketone, or another non-water-based solvent can preferably be used.

Also, one type, or two or more types, of polymer materials appropriately selected from among polyfluoride vinylidene (PVDF), polytetrafluoroethylene (PTFE), styrene butadiene rubber (SBR), carboxymethylcellulose (CMC), and other polymers, can preferably be used as a binding agent, a thickening agent, or as various other additives. The task of imparting (typically by application) of compositions, in which the above electrode active materials are dispersed in an appropriate solvent, to the respective current collectors 32 and 42 can for example be performed by using an appropriate application apparatus (slit coater, die coater, comma coater, or similar) to apply prescribed amounts of the compositions.

After accommodating the electrode unit 20 in the case 10, electrolyte is injected into the case. As the electrolyte of a lithium ion battery, a non-aqueous electrolyte comprising a non-water-based solvent and a lithium salt (supporting salt) added to the solvent and dissolved, can be used. As the non-water-based solvent, for example one type, or two or more types, selected from among non-water-based solvents such as propylene carbonate (PC), ethylene carbonate (EC), diethyl carbonate (DEC), and other solvents used in the electrolytes of lithium ion batteries in general, can be employed. As the supporting salts included in the electrolyte, one type, or two or more types, of lithium compounds (lithium salts) selected from among $LiPF_6$, $LiBF_4$, $LiClO_4$, or similar, can be used.

After injecting the electrolyte, the lid 60 is installed in the opening portion 12 of the case 10, and by performing laser irradiation from the case side a (see FIG. 4) to perform joining, the sealed battery 100 of one preferred embodiment of the invention is constructed.

Below, a test example relating to this invention is explained; however, the invention is not limited to this specific example.

First, a case of aluminum for a sealed battery, of size 150 mm (length)×30 mm (width)×100 mm (height), and of thickness 1 mm over the entire perimeter, was prepared. Also, a lid of aluminum for a sealed battery, of size 150 mm (length)×30 mm (width), of thickness 3 mm, and comprising an inside protruding portion, was prepared.

In this test example, nine types (samples 1 through 9) of cases, provided with barrier layers of different constituent materials and sizes (distances L and average thicknesses M), and a case with no barrier layer provided (sample 10), were prepared. Table 1 lists the constituent materials and sizes of the barrier layers of the samples 1 through 10.

The distance L of the barrier layer is the distance on the opening end face of the peripheral wall portion between the edge portion on the outer side of the case and the inside edge of the case peripheral wall portion; the average thickness M is the average thickness of the portion formed between the edge portion on the outer side of the case and the inside edge of the case peripheral wall portion (see FIG. 3).

TABLE 1

| | Barrier layer | | |
|---|---|---|---|
| | Constituent material | Distance L (mm) | Average thickness M (mm) |
| Sample 1 | PP | 0.3 | 0.05 |
| Sample 2 | PP | 0.3 | 0.1 |
| Sample 3 | PP | 0.3 | 0.3 |
| Sample 4 | PP | 0.3 | 0.5 |
| Sample 5 | PP | 0.5 | 0.1 |
| Sample 6 | PP | 0.7 | 0.1 |
| Sample 7 | PP | 1.0 | 0.1 |
| Sample 8 | PE | 0.3 | 0.1 |
| Sample 9 | EPDM | 0.3 | 0.1 |
| Sample 10 | — | 0 | 0 |

Thus using a total of ten different types of cases (30 samples of each), which were samples 1 through 9 having barrier layers and sample 10 without a barrier layer, the presence or absence of shaving particles intermixed at the time of lid installation, the presence or absence of sputtered material intermixed at the time of laser welding, and the average withstand pressure after welding, were investigated. Measurement results for samples 1 through 10 appear in Table 2.

This test example relates to the sealing structure of cases and lids characterized by this invention, and because electrode units and electrolyte are unnecessary for the purpose of the tests, these battery constituents were not accommodated within the cases.

TABLE 2

| | Number with shaving particles intermixed (N = 30) | Number with sputtered material intermixed (N = 30) | Average withstand pressure (MPa) |
|---|---|---|---|
| Sample 1 | 0/30 | 0/30 | 5.2 |
| Sample 2 | 0/30 | 0/30 | 5.1 |
| Sample 3 | 0/30 | 0/30 | 4.5 |
| Sample 4 | 0/30 | 0/30 | 0.8 |
| Sample 5 | 0/30 | 0/30 | 5.2 |
| Sample 6 | 0/30 | 0/30 | 3.4 |
| Sample 7 | 0/30 | 0/30 | 1.6 |
| Sample 8 | 0/30 | 0/30 | 4.9 |
| Sample 9 | 0/30 | 0/30 | 5.2 |
| Sample 10 | 11/30 | 16/30 | 5.0 |

Presence/Absence of Intermixed Shaved Particles

The presence or absence of intermixed shaved particles was determined, after installing the lid in the case opening portion, by visually observing whether shaved particles had fallen into the case. Results appear in Table 2.

As shown in Table 2, for sample 10, the intermixing of shaved particles in the installation operation was confirmed eleven times out of a total of 30 installation operations. On the other hand, no intermixing of shaved particles was observed at all in a total of 30 installation operations when performing installations using the cases of samples 1 through 9, in which barrier layers were provided.

Presence/Absence of Intermixed Sputtered Material

The installed lids were laser-welded to the cases. Specifically, over the entire perimeter, the portion of opposition (proximity) of the lid and the case peripheral wall portion with the lid installed at the prescribed position was irradiated with a laser (for example a hybrid laser of a YAG pulsed laser and a CW laser), to perform welding.

The presence or absence of intermixed sputtered material accompanying welding was determined by visually observing whether sputtered material had fallen into the case. Results appear in Table 2.

As shown in Table 2, for sample 10, the intermixing of sputtered material was confirmed 16 times, or more than half, out of a total of 30 installation operations. On the other hand, no intermixing of sputtered material was observed at all in a total of 30 installation operations when performing installations using the cases of samples 1 through 9, in which barrier layers were provided.

Measurement of Average Withstand Pressure

After the welding, a hole was opened in the lid, oil (silicon oil or similar) was injected into the case, and the limiting internal pressure (withstand pressure) until cracks appeared in the welded portion (that is, the injected oil leaked) was measured. Withstand pressure tests were conducted for samples 1 through 10 (30 samples of each), and average withstand pressures were determined. Results appear in Table 2.

As shown in Table 2, comparatively high withstand pressures (that is, at least 4.5 MPa, and for a number of particularly satisfactory samples, 5.0 MPa and higher) were exhibited by samples 1, 2, 3, 5, 8, and 9. On the other hand, average withstand pressures were low for sample 4 (average thickness M≤0.05 mm), sample 6 (distance L≤0.7 mm), and sample 7 (distance L 1.0 mm). In particular, sample 4 exhibited a low value, with the average withstand pressure at 1.0 MPa or lower.

Evaluation of Constituent Materials

In these tests, as shown in Table 1 three different types of materials were used as materials forming barrier layers. Samples 1 through 7 used PP (polypropylene) as the constituent material of the barrier layers, sample 8 used polyethylene (PE), and sample 9 used ethylene propylene diene rubber (EPDM). Upon comparing the results of sample 2 (PP), sample 8 (PE), and sample 9 (EPDM), for which the barrier layer sizes were equal (distance L 0.3 mm and average thickness M 0.1 mm), in all cases no intermixing of shaved particles or intermixing of sputtered material was observed, and all exhibited high average withstand pressures.

As is clear from the above test example, by means of this invention, prevention of the occurrence of shaved particles at the time of lid installation, and prevention of intermixing of sputtered material accompanying welding, can be achieved. Further, a highly reliable sealed battery, comprising high welding strength (sealing characteristics) between case and lid, can be provided.

In the above, a preferred embodiment of the invention has been explained; but the description is not limiting, and various alterations are possible. For example, rather than a mode in which the barrier layer is formed in advance on the case side, the barrier layer may similarly be formed on the corresponding portion of the lid.

Further, the type of sealed battery is not limited to the above-described lithium ion battery, and batteries may have various different electrode constituent materials and electrolytes, such as for example lithium secondary batteries using lithium metal and lithium alloy as the negative electrode, nickel hydride batteries, nickel cadmium batteries, and so-called physical batteries such as electrical dual-layer capacitors. Further, no limitations in particular are imposed on battery shape, and for example rectangular parallelepiped, cylindrical, and other external shapes are possible; and the size and other aspects of the battery configuration can also be modified appropriately according to the application (typically for vehicle use).

INDUSTRIAL APPLICABILITY

Figure 5:
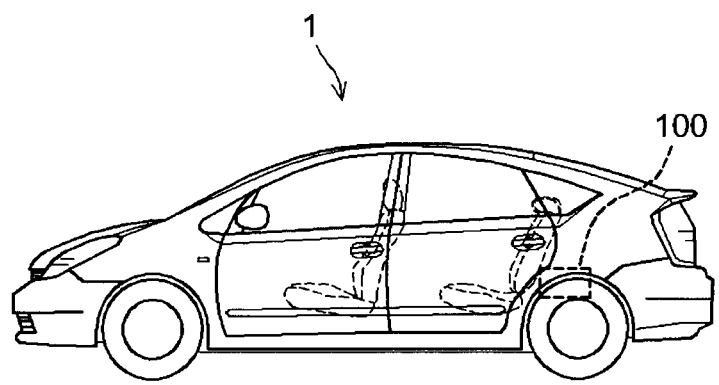
FIG. 5 is a side view schematically showing a vehicle (automobile) comprising a sealed battery of this invention.

A sealed battery provided by this invention (in particular, preferably a lithium ion battery or other lithium secondary battery, or a secondary battery such as a nickel hydride battery) can preferably be uses as the power sources for motors (electric motors) mounted in automobiles and other vehicles. Hence by means of this invention, a vehicle (typically an automobile, and in particular a hybrid automobile, an electric automobile, a fuel cell automobile, or another automobile comprising an electric motor) 1, comprising as a power source a sealed battery 100 provided by this invention (typically, a battery pack formed by connecting in series a plurality of batteries 100 as single cells), as shown schematically in FIG. 5, can be provided.

The invention claimed is:

1. A sealed battery, comprising:
   a case having a case opening portion and a peripheral wall portion surrounding the case opening portion;
   a lid which closes the case opening portion;
   an inside protruding portion formed in a face of the lid opposing the case, wherein the inside protruding portion enters into the case and mates with the case opening portion;
   a welding region between the peripheral wall portion and the lid, wherein the peripheral wall portion and the lid are directly joined to each other by the welding region; and
   a barrier layer provided in an opposing region between the peripheral wall portion and the lid in which the peripheral wall portion and the lid are in close proximity, and which is at least a region including an inside edge of the peripheral wall portion forming a case opening portion periphery, wherein an edge portion of the barrier layer on the outer side of the case is formed midway in the opening end face of the case peripheral wall portion, between the outside edge and the inside edge, without reaching the outside edge of the peripheral wall portion.

2. The sealed battery according to claim 1, wherein the distance L between the edge portion of the barrier layer on the outer side of the case and the edge on the inside of the peripheral wall portion is determined so as to satisfy L≤0.5t, where t is a thickness of the opening end face of the peripheral wall portion, defined by the distance between the outside edge and the inside edge.

3. The sealed battery according to claim 1, wherein the average thickness M of the portion of the barrier layer formed between the edge portion on the outer side of the case and the inside edge of the peripheral wall portion is determined so as to satisfy M≤0.3t, where t is the thickness of the opening end face of the peripheral wall portion, defined by the distance between the outside edge and the inside edge.

4. The sealed battery according to claim 2, wherein the average thickness M of the portion of the barrier layer formed between the edge portion on the outer side of the case and the inside edge of the peripheral wall portion is determined so as to satisfy M≤0.3t, where t is the thickness of the opening end face of the peripheral wall portion, defined by the distance between the outside edge and the inside edge.

5. The sealed battery according to claim 2, wherein the t is in a range between 0.3 mm and 2 mm.

6. The sealed battery according to claim 3, wherein the t is in a range between 0.3 mm and 2 mm.

7. The sealed battery according to claim 1, wherein the barrier layer is made of a synthetic resin or a rubber.

8. The sealed battery according to claim 2, wherein the barrier layer is made of a synthetic resin or a rubber.

9. The sealed battery according to claim 3, wherein the barrier layer is made of a synthetic resin or a rubber.

10. The sealed battery according to claim 5, wherein the barrier layer is made of a synthetic resin or a rubber.

11. The sealed battery according to claim 1, wherein the barrier layer is provided in close proximity to the welding region.

* * * * *